US00RE44598E

(19) United States
(12) Reissued Patent
Prince

(10) Patent Number: US RE44,598 E
(45) Date of Reissued Patent: Nov. 12, 2013

(54) GOLF PUTTER

(76) Inventor: Robert P. Prince, Ridgefield, CT (US)

(21) Appl. No.: 10/408,264

(22) Filed: Apr. 8, 2003

Related U.S. Patent Documents

Reissue of:
(64) Patent No.: 6,213,890
Issued: Apr. 10, 2001
Appl. No.: 09/128,622
Filed: Aug. 4, 1998

(51) Int. Cl.
*A63B 53/08* (2006.01)
*A63B 53/00* (2006.01)

(52) U.S. Cl.
USPC ..... 473/292; 473/340; 473/297; 473/294

(58) Field of Classification Search
USPC ..... 473/292–294, 297, 300, 340, 341, 349
See application file for complete search history.

(56) References Cited

U.S. PATENT DOCUMENTS

| | | | | |
|---|---|---|---|---|
| 3,188,086 | A | 6/1965 | Parmley | |
| 3,679,207 | A | 7/1972 | Florian | |
| D234,209 | S | 1/1975 | Bizovi | |
| 4,163,554 | A | 8/1979 | Bernhardt | |
| 4,461,479 | A | 7/1984 | Mitchell | |
| 4,592,552 | A | 6/1986 | Garber | |
| 4,600,195 | A | 7/1986 | Hunter | |
| 5,024,438 | A * | 6/1991 | Candow | 473/294 |
| 5,209,474 | A | 5/1993 | Voyer | |
| 5,333,870 | A * | 8/1994 | Stevenson, Jr. | 473/251 |
| 5,364,102 | A | 11/1994 | Appledorn | |
| 5,401,022 | A | 3/1995 | McCready | |
| 5,465,967 | A | 11/1995 | Boeckenhaupt | |
| 5,474,300 | A | 12/1995 | Scalise et al. | |
| 5,554,078 | A | 9/1996 | Hannon et al. | |
| 5,571,053 | A * | 11/1996 | Lane | 473/336 |
| 5,595,385 | A | 1/1997 | Jablonski | |
| 5,632,691 | A | 5/1997 | Hannon et al. | |
| 5,634,859 | A | 6/1997 | Nesbitt | |
| 5,671,923 | A | 9/1997 | Huang | |
| 6,135,896 | A | 10/2000 | Miao | |
| 6,394,910 | B1 | 5/2002 | McCarthy | |
| 6,506,128 | B1 | 1/2003 | Bloom, Jr. | |
| 6,966,846 | B2 | 11/2005 | Bloom, Jr. | |
| 7,004,849 | B2 | 2/2006 | Cameron | |

OTHER PUBLICATIONS

U.S. Appl. No. 11/170,195, filed Jun. 30, 2005 to Prince et al.
Office Action, mailed Apr. 10, 2007 from prosecution of U.S. Appl. No. 11/170,195, filed Jun. 30, 2005 to Prince et al.
U.S. Appl. No. 11/170,195 to Robert P. Prince et al., filed Jun. 30, 2005.
McEvoy, B., Belly Putters Can Win You Over; USGA is Iiffy (published 2003 or after)[online], [retrieved on May 8, 2006], Retrieved from the Internet:, URL: http://www.worldgolf.com/golf-equipment/belly-putters-156.htm>.
Office action, mailed Dec. 15, 2008 for U.S. Appl. No. 11/170,195—Prince et al.

* cited by examiner

*Primary Examiner* — Kien Nguyen
(74) *Attorney, Agent, or Firm* — Novak Druce Connolly Bove + Quigg LLP

(57) ABSTRACT

The instant invention provides a putter for use by a golfer in playing golf. The putter includes: a shaft long enough to rest against the abdomen; a head of greater than conventional mass fixed to the first end of the putter; and, a handle fixed to the second end of the putter. The handle further includes: an upper hand grip; a lower hand grip substantially length to rest against the abdomen navel dimensionally spaced from the upper hand grip; and, a counterweight positioned within the handle substantially near the upper hand grip, for providing the putter with a conventional center of gravity. The putter is designed for maximizing the sweet spot of the head while enabling the golfer to putt a golf ball by pivoting the putter substantially only at a point located at about the upper hand grip, from an otherwise conventional crouched stance.

71 Claims, 4 Drawing Sheets

GOLF PUTTER

Matter enclosed in heavy brackets [ ] appears in the original patent but forms no part of this reissue specification; matter printed in italics indicates the additions made by reissue.

BACKGROUND OF THE INVENTION

1. Field of the Invention

The instant invention broadly relates to novel implements used in the performance of a sport. More specifically, the invention relates to a sport that employs a ball and an instrument for striking it. Still more specifically, the invention relates to the game of golf and a club used for striking a golf ball. Still even more specifically, the invention relates to the game of golf and a putter for advantageously putting a golf ball.

2. Background Discussion

Various related technology has been proposed by the prior art as exemplified by the following United States Patents which are incorporated herein in their entireties for the purpose of enabling the person of ordinary skill in the art to practice the instant invention.

Golf putter technology has been the subject of many innovations in recent years, some of which are scientifically well-founded, others of which may be considered merely psychological. However, whether the results are psychological or based on scientific reasoning, the value of the putter is in the results. Regardless, innovations which are scientifically sound are preferred since they are more widely accepted by a large range of golfers.

Through the years there has been much effort expended in improving golf clubs, particularly putters, and with much concentration on the development of means to enable a golfer to properly strike a golf ball on a true line toward the hole. In particular, it has been common to provide a method to align the head of the putter for more accurate putting. See, for example, U.S. Pat. Nos. 3,917,277, 3,866,922, 3,955,819, 3,921,984, 4,209,172, 4,519,612, and 3,880,430.

In addition, numerous efforts have been made to alter the weight distribution of a putter in an effort to reduce the tendency of a putter to rotate when a golf ball is struck off center. See, for example, U.S. Pat. Nos. 4,265,451, 3,843,122, 4,253,667, 4,369,974, and 1,537,320.

In addition, in the never-ending search to improve putting, numerous practice devices not usable on a golf course have been invented, including U.S. Pat. Nos. 4,153,235, 4,010, 958, 3,893,678, 3,893,673, and 3,384,376.

U.S. Pat. No. 3,384,376 discloses a practice golf putter with a shaft running through the face of the putter and detachable guides directing both in front of and behind the face of the putter. Such a putter may not be a legal putter under the United States Golf Association Rules since it provides alignment means in front of the club face. In addition it does not provide the balanced weight distribution found to be most conducive for accurate putting.

In order to accomplish the conventional golf swing, the golfer stands facing the ball, with the cup located at an approximate 90° angle from the direction in which the golfer is facing. Taking this stance, the golfer must choose between looking at the ball, the terrain over which the ball is intended to travel, or the cup. In no manner can the golfer obtain a line-of-sight that includes both the ball and the cup while occupied with this stance. Nevertheless, this stance and approach is advantageous when attempting very long putts owing to the large amount of energy imparted to the ball. However, the vast majority of putts attempted are of relatively short distance, and require accuracy rather than brute force. For this majority of putts, the conventional stance offers serious difficulties, and the long backstroke and follow through provided are of no particular benefit. As mentioned above, the golfer cannot establish a line-of-sight from the ball to the cup while facing 90° from the cup. When using the conventional stance, most golfers stand behind the ball to establish such a line-of-sight, then lose the effect upon approaching the ball. It has been found advantageous in many other sports to continuously maintain such a direct line-of-sight. For example, it is generally conceded that the jump shot has greatly contributed to modern basketball field-goal percentages. The jump shot is especially effective because the shooter jumps directly toward the basket when he releases the ball. His hand and arm, the ball, and the basket are all along a line or arc extending directly in front of the shooter. This is in contrast to the low percentage hook shot attempted at approximately a 90° angle from the front of the shooter's body. Likewise, in baseball, fielders are instructed to position themselves directly in front of a ground ball, allowing them to follow the ball straight into the glove, and greatly reducing the chance of error. Similar logic is believed applicable to putting, where the chance of error can be greatly reduced, and the percentage of completed putts increased, by keeping the ball in front of the golfer along a line-of-sight to the cup.

Croquet style putters have been proposed in the past, which partially recognize the advantage of maintaining such a line-of-sight. However, these clubs also exhibit significant disadvantages. For example, the United States Golf Association rules require that a golfer have both feet on one side of a line extending from the ball to the cup. This rule effectively prohibits swinging a croquet style putter between the legs. Also, the existing croquet style putters are not configured for use with a conventional swing, and so are limited to use in short distance putting. Since a golfer is likely to encounter situations requiring both long and short putts during the course of a game, such putters constitute an additional club to be carried along with a conventional putter.

Many types of golf putters have heretofore been developed for the purpose of improving the chances of an ordinary player to properly strike the golf ball. These developers have concentrated on improving the putter's head shape, obtaining a better balance for the head, changing the ball-striking surface, placing indicia on the head, and the like.

As examples of such golf putters, attention is directed to the following U.S. Pat. Nos. Des.: 196,734, 218,178, 234, 206, 234,207, 234,208, 234,209, 234,858, 235,567, 236,517, 239,401, 239,402, 4,592,552, 4,163,554, 5,401,022, 5,474, 300 and 239,725, incorporated herein by reference.

Other prior art schemes have been proposed to aid the putter by providing a putter that includes variously weighted handles. Exemplary of these patents are: U.S. Pat. Nos. 5,364, 102, 4,461,479, 5,465,967 and 5,554,078.

Still other prior art patents have proposed putters having various novel elemental length relationships, elemental weight relationships, and uniquely designed elements, to aid the pursuit of the elusive perfect putt stroke. See for example: U.S. Pat. Nos. 5,209,474, 5,632,691 and 5,595,385.

U.S. Pat. No. 3,219,348 for instance, describes a golf putter featuring a handle having a triangular cross section which is supposed to provide a stabilizing means for gripping the club.

U.S. Pat. No. 3,578,332 describes a putter having an elongated head and is provided with an enlargement projecting upwardly from the top surface of the head and outwardly from the rear surface with the shaft connecting to the head at the enlargement. U.S. Pat. No. 3,923,308 discloses a putter having a head provided with a vertical slot of sufficient width and length dimensions to permit visual observations therethrough of the undersurface, that is, the putting green.

In U.S. Pat. No. 3,679,207 the player must use a side stance, that is, he must face the target or cup and stand with both feet substantially parallel to the line of putt. This putter is provided with an extra-length shaft which ungulates by about 10° from the vertical and terminates in a special-purpose handle. The shaft is made purposely longer than a standard shaft such that the player can putt from a generally upright position. For this purpose, the shaft is about 50 inches long compared to a standard shaft which is about 40" long. The angulation of the shaft at 10° directs the shaft towards the head of the player when the head of the putter is located to one side of the player. The putter head is weighted and a counterbalancing weight is included on the upper end of the handle. This putter requires that one player's hand be placed on the balance point along the shaft and the other hand on the handle.

As is well known, the stance or style of the player contributes significantly to his putting ability and his ultimate chances of success. This is especially true since a large percentage of all strokes in regulation golf play are putts. Moreover, putting skill is developed with relatively few available guidelines compared to the rest of the golf game, resulting in heavy dependence on the part of the player and on the physical embodiment of his preferred putter. It is also evident that for a full understanding of the advantages of one type of putter versus another type, consideration must be given to the putting style to be employed with the particular golf putter.

Many of the sport believe that the most accurate type of putter is that of the croquet type or pendulum type. With these types, putting is basically effected by the pendulum type movement of the club between an individual's legs while the golfer faces the direction in which the ball is to be putted. However, this style of putting has been from time to time, ruled illegal by golf societies who require that a golfer putt from the side of the ball. In addition, special clubs have been designed as an accommodation for handicapped persons who may only have one arm. Such clubs are difficult for such a person to use. In order to obtain any reasonable degree of accuracy such a handicapped person must be provided with still a greater handicap due to the commercial unavailability of putters designed specifically for handicapped persons.

To coordinate the golfer's stance, eyesight alignment, club head movement, and club head angle at impact so that the ball moves along its intended path for the desired distance, takes many hours of practice in order to achieve even marginal success. In an effort to make "lining-up" of a putt somewhat easier, certain golfers have preferred to us e a croquet-style putter. This style allows the golfer to stand with one foot positioned on each side of a line coincident with t he intended path of travel for the ball and to sight directly through the ball rather than standing at a right angle and slightly perpendicular to the intended path. However, in accordance with at least the "1977 Rules of Golf" as approved by the United States Golf Association (USGA), any putter which is intended to be "legal" for USGA sanctioned play shall be designed such that "the axis of the shaft from the top to a point not more than five inches above the sole shall diverge from the vertical by a t least 10° in relation to the horizontal line determining length of head." Consequently, unless a putter is designed with this side angle of at least 10°, a feature conventional croquet-style putters do not have, it will not be a "legal" putter. The USGA rules also require that the golfer stand to one side of the intended path rather than being positioned such that a line extension of this intended path is located between the feet.

Examples of prior art devices which have been condemned as "illegal" designs under the "1977 Rules of Golf" were disclosed in a patent to Raymond J. Florian, U.S. Pat. No. 3,679,207 entitled "Golf Putter Construction;" and "Golf World" magazine of Jun. 19, 1964 on page 4.

In order to achieve the advantages of a croquet-style of putting and in order to conform to at least past USGA rules, a putter shaft would have to be arranged such that it angled to the side by at least 10° off of vertical as well as angled to the rear (away from the ball-striking putter face).

As mentioned previously, one advantage of the croquet-style putter is that it enables the golfer to stand so that his line of sight is through the ball and coincident with the intended path of travel of the ball. However, since the golfer must stand to the side of this intended path of travel, one way that sighting in the manner described can be accomplished is to stand so that the feet, positioned behind the ball, are pointed in a direction parallel to this intended path and to lean to the side so that the golfer's head extends over the intended path of travel. Such a stance could be established irrespective of the putter used, but due to club head weight and balancing, most conventional putters swung from this stance will not perform acceptably and current croquet-style putters which are preferred for such a swing are illegal. A related problem to achieving the stance described above, is that with the use of a standard length putter, the golfer must bend at the waist a significant degree in order to be able to grip the club shaft. The contortions of standing to the side, bending well over and leaning to the side place the golfer in an unnatural and awkward position. In this position, it is difficult for the golfer to remain steady, a requisite for any good puffing stroke. To avoid the need to bend at the waist, putters have been designed with elongated shafts, such as disclosed in the "Golf World" reference and by the prior Florian patent. However, although Florian discloses a golf putting technique which is similar in appearance to a "legal" croquet-style of swing, there are disadvantages with this design. The shaft in Florian is offset at a 10° angle to the side relative to the line of intended travel of the ball, but the shaft is not bent to the rear as a croquet-style putter is bent. The stance of the golfer makes it difficult to sight through the ball, as the golfer's eyes are not in line with the ball and the hole. As the club is drawn back, the 10° offset causes an arc to be swept around the golfer's body, and when the downward swing occurs, the club head control and a true pendulum motion are difficult to achieve.

A final feature of putters in general, and in particular putters having elongated shafts, is that the "feel" of the club as transmitted through the grips to the golfer's hands is important for control and accuracy. The farther the hands are placed from the point of impact to the ball, the more difficult the control of the putt. Thus, the "Golf World" reference and the Florian patent, which disclose elongated shafts, also disclose two gripping portions, the lower portion providing a gripping location closer to the point of impact. An equally important feature is the material used for the gripping portions. If the material is too soft or too hard, it may not transmit the necessary feel to the hands. It is preferred that putters which have the two gripping portions and which are swung in a croquet style, be pivoted by the hand on the upper grip and guided by the hand on the lower grip. Thus it would be an improvement to the prior art to construct the upper gripping portion out of a relatively soft, synthetic material enabling a secure and firm hold on the putter shaft, and the lower gripping portion to be constructed out of a harder synthetic material for greater sensitivity to the club head movement and ball impact. U.S. Pat. No. 1,213,014 issued to Rees also discloses a golf club shaft having two distinct grips. However, the purpose of these two grips is to allow the club swing to be controlled by selected fingers and for the other fingers to have virtually no effect as to this control.

Putting principles are also described U.S. Pat. Nos. 3,679,207 and 4,227,694. Each of the above inventions addresses one or several of the three most important elements of successful putting which are: 1) orienting the putter head such that at the point of impact the head face is perpendicular to the desired path for the ball to travel, 2) impacting the ball at its centerline, and 3) swinging the putter with a smooth motion in line with the desired direction of ball travel.

U.S. Pat. No. 4,605,228 teaches that there are various problems related to putting which golfers have attempted to overcome in their search for the ultimate putter. This patent teaches several approaches that have been used to develop putters that accurately propel a golf ball to the cup. The putter configuration is used in a modified croquet style stance using the golfer's arm as part of a pendulum arm; and because of the short shaft length, the invention requires constant modification of the golfer's stance in order to use the putter for various length putts resulting in inconsistent results. Additionally, putters of this configuration require the golfer's body to guide the putter towards the ball when putting. The muscular action of guiding the putter towards the ball compounds the putting problems due to the difficulty in maintaining the putter head orientation relative to the ball and desired path of ball travel. This effect may result in the putter face striking on the ball at various points of impact.

U.S. Pat. No. 3,679,207 also teaches the use of a modified croquet style of putting using a long shaft putter. This long shaft putter helps the golfer by allowing the use of a similar stance and body/putter relationship under varying conditions. While the position and stance variation problems with putters used in a modified croquet style is alleviated by this configuration, the golfer's body has a tendency to twist as the putter is swung. This twisting results in a roundhouse swing at the ball which makes hitting the ball centerline with the putter face perpendicular to the desired path of ball travel very difficult to consistently accomplish.

Many of the aforedescribed problems are overcome by the pendulum type putters shown in U.S. Pat. Nos. 3,170,690 and 4,491,323. The putter of U.S. Pat. No. 3,170,690 uses a rigid shaft hinged to a rigid handle which, due to its employment of a pendulum-like principle, enables the golfer to more consistently impact the putter head at the ball centerline. While the putter is an improvement over non-pendulum putters, the bi-directional hinged construction uses a singular pivot axis which is difficult to align with the desired ball path. This construction also makes the ball roll distance difficult to control. The invention of U.S. Pat. No. 4,491,323 is also difficult to maintain in proper alignment. In this patent, the bearing faces located at the putter top have a singular pivot axis and must be in correct alignment with the desired ball path. Because of the small size of the club's gripping device, it is difficult to appreciate its alignment with the desired ball path; consequently, aiming the putter is relatively difficult.

None of the foregoing prior art references teach a golf putter with increased mass and a compensating mass distribution sufficient to maximize the "sweet spot" on the putter head and advantageously employ the physical principle of inertia. Surprisingly, through such means, the present invention substantially minimizes extraneous error which could influence a putt stroke after the golfer has committed to it, simply through the practical application of principles of physics. Thus, the availability of such a putter would be of great advantage to golfers.

SUMMARY OF THE INVENTION

The instant invention in large part solves the problems of the prior and fulfills a long felt need by providing a new and improved golf putter The instant invention provides an improved golf putter that exploit long known principles of physics.

In light of the foregoing, it is therefore an object of the instant invention to provide a new and improved golf putter which has all of the advantages of the prior art and none of its disadvantages.

It is another object of the instant invention to provide a new and improved putter which may be easily and efficiently manufactured and marketed.

It is another object of the instant invention to provide a new and improved golf putter which is of a durable and reliable construction.

It is another object of the instant invention to provide a new and improved golf putter which can be manufactured at comparatively low cost with regard to both labor and materials, and which accordingly can be sold at a comparatively low cost, thus promoting commerce.

It is a further object of the instant invention to provide a new and improved golf putter which provides at least some of the advantages of the prior art schemes, while simultaneously eliminating at least some of the disadvantages of them.

It is an object of the instant invention to provide a new and improved golf putter having a maximized "sweet spot."

It is a further object of the instant invention to provide a new and improved golf putter which is substantially more forgiving of inadvertent, unintended or involuntary deviations otherwise typically imposed on a golfer's putt stroke.

It is a further object of the instant invention to provide a new and improved putter that includes elements that have a substantially increased inertia of motion during a putt stroke.

It is a further object of the instant invention to provide a new and improved putter that includes elements that have a substantially increased inertia of rest during a putt stroke.

Other objects, features, and advantages of the instant invention, in its details of construction and arrangement of parts, will be seen from the above, from the following description of the preferred embodiment when considered in light of the drawings and the appended claims.

DETAILED DESCRIPTION OF THE INVENTION

Figure 1:
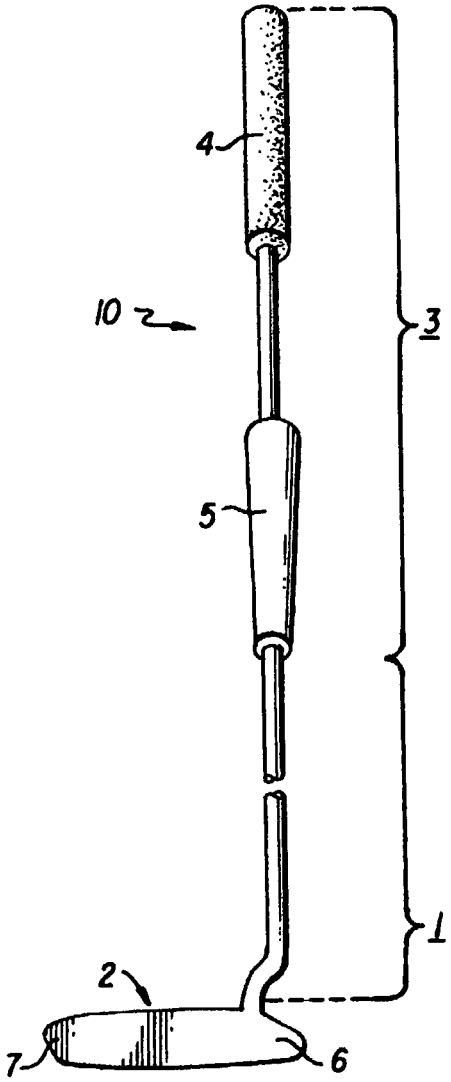
FIG. 1 depicts fragmented views of the instant putter.

As specifically depicted in FIG. 1, the present invention discloses a novel golf putter 10 for use by a golfer in playing golf. The putter 10 includes a shaft 1, having a length of from about 15 inches to about 36 inches. More preferably, the length of shaft 1 is from about 16 inches to about 28 inches; and, most preferably, from about 20 inches to about 24 inches. The shaft 1 may be constructed of substantially any conventional material of construction or any known combination of such materials; including but not limited to: iron, steel, titanium, lead, nickel, aluminum, brass, bronze, and the like; as well as any conventionally known plastic or plastic composite, including but not limited to: carbon fiber composite, fiberglass, and the like. Of the foregoing, steel, titanium, aluminum, and carbon fiber composite are preferred. Of the foregoing, steel and aluminum are most preferred because of cost considerations; and, carbon fiber composite is most preferred because of performance considerations. It is further contemplated by the invention that the foregoing materials can be used in any known combination, in the construction of the instant shaft 1.

The instant putter 10 also includes a head 2 having back 24, a face 22, a heel 6 and a toe 7. Instant head 2 has a mass of from about 16 ounces to about 80 ounces. More preferably, the mass of the instant putter head 2 is from about 16 ounces to about 64 ounces; and, most preferably, from about 18 ounces to about 36 ounces. An about 24 to about 36 ounce head is typical. Suitable materials of construction for the instant head 2 include any conventionally known material or combination of such materials currently used for this purpose, including but not limited to: iron, steel, lead, nickel, brass, bronze, combinations thereof and the like. Of the foregoing, steel, lead, nickel and brass are preferred. Of the foregoing, the combination of steel and lead is preferred in regard to cost considerations; and, the combination of brass and lead is preferred in regard to aesthetics. The head 2 is permanently fixed to one end of the shaft 1, by any conventional arrangement known in the art; including but not limited to: mechanical fixing, including but not limited to: screw and thread, and the like; permanent bonding, including but not limited to: welding, brazing, glueing, cementing, and the like.

Figure 4:
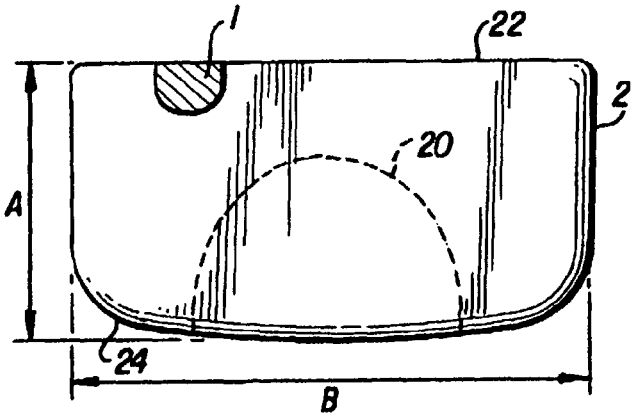
FIG. 4 depicts a top view of the head of the instant putter.
Figure 5:
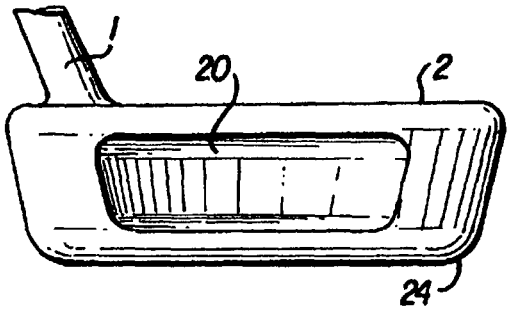
FIG. 5 depicts a back view of the head of the instant putter.

As shown in FIGS. 4 and 5, the head 2 may be provided with a hollow in the back 24 behind the face 22.

Figure 8:
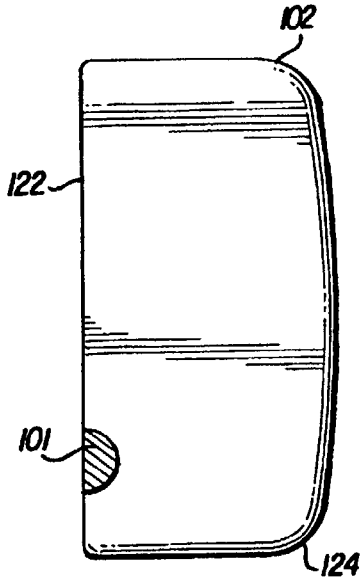
FIG. 8 depicts a top view of an embodiment of the instant putter having an enclosed space in the head of the putter.
Figure 11:
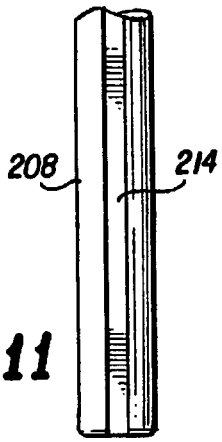
FIG. 11 is a rear view of the portion of FIG. 10.
Figure 10:
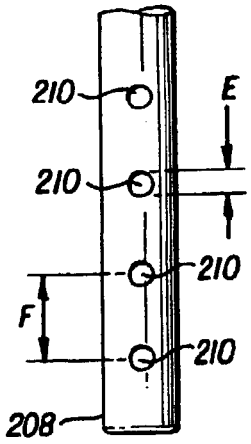
FIG. 10 is a front view of a portion of the mechanism of FIG. 9.

FIG. 8 shows a head 102 of solid metal having a back 124 and a face 122.

The putter 10 of the present invention also includes a handle 3 having a length of from about 14 inches to about 24 inches; and, preferably, from about 17 inches to about 21 inches. As is the case with shaft 1, handle 3 may be constructed of substantially any conventional material of construction or any known combination of such materials; including but not limited to: iron, steel, titanium, nickel, lead, aluminum, brass, bronze, and the like; as well as any conventionally known plastic or plastic composite, including but not limited to: carbon fiber composite, fiberglass, and the like. Of the foregoing, steel, titanium, aluminum, and carbon fiber composite are preferred. Of the foregoing, steel and aluminum are most preferred because of cost considerations; and, carbon fiber composite is most preferred because of performance considerations. The handle 3 may be constructed as a separate element, or merely as an extension of shaft 1. If constructed as a separate element, the handle 3 is permanently fixed to the other end of the shaft 1 in the same manner as the head 2.

Figure 7:
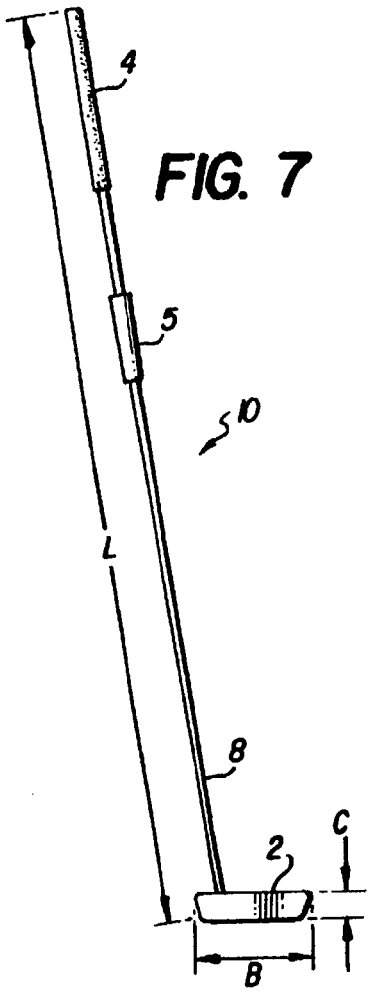
FIG. 7 schematically shows the instant putter.

The overall length "L" of the putter 10 (FIG. 7) is sufficient for the putter to rest against the navel or abdomen of the golfer. Thus, the overall length "L" of the putter 10 is about 29 to about 52 inches. Typical head dimensions include a width "A" of about 3.36 inches, a length "B" of about 5.04 inches, and a face height "C" of about 1.04 inches. Face heights range typically from about ¾ to about 1 inch.

Figure 6:
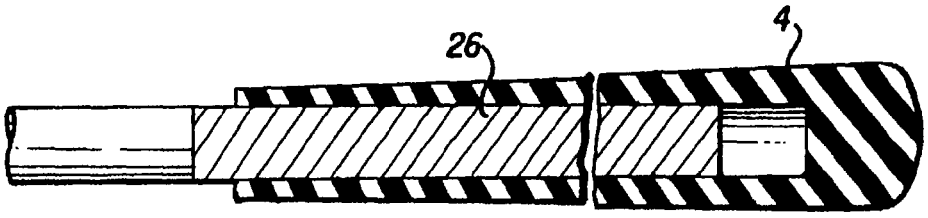
FIG. 6 depicts a cross-section of a portion of a handle of the instant putter to show a typical counterweight location.

The handle 3 may be fixed to the second end of the shaft 1. The handle 3 further includes an upper portion having an upper hand grip 4; and a lower portion having a lower hand grip 5 substantially spaced therefrom on the handle 3. Further included in the handle 3 is a counterweight 26 (FIG. 6) fixedly positioned substantially near or within the upper hand grip 4 sufficient to provide the putter with a conventional center of gravity. The exact location of the counterweight will depend on its weight and the weights of other elements of the putter 10. The length of handle 3 is from about 12 inches to about 36 inches in length. The upper hand grip 4 is proximately positioned at one end of the handle 3 and the lower hand grip 5 is proximately positioned at the other end of the handle 3.

Generally, the shaft and handle are sufficiently stiff to avoid undue flexing during putting.

Figure 2:
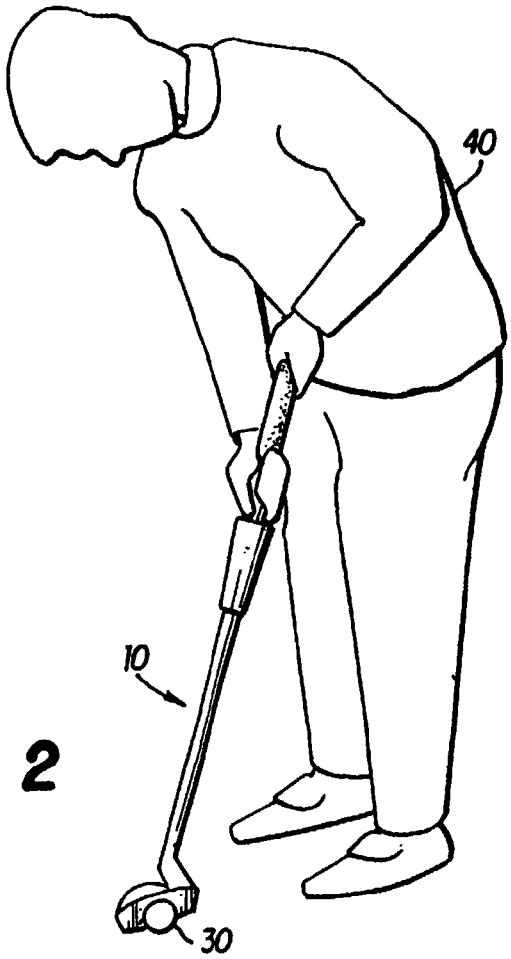
FIG. 2 depicts the manner in which the instant putter is used by a golfer in a substantial traditional crouched stance with a golf ball directly below the eyes of a golfer.

All of the foregoing elements of the instant putter 20 are designed, dimensioned, sized and/or weighted sufficiently for maximizing the sweet spot of the head 2 and for enabling the golfer to putt a golf ball 30 by pivoting the putter substantially only at a point located at about the upper hand grip 4 from an otherwise conventional crouched stance, as shown in FIG. 2, as distinguished from the conventional pivot point, i.e., the back of a golfer's neck. In FIG. 2, the golf ball 30 is directly below the eyes of the golfer 40.

Upper and lower grips 4, 5 range in length from slightly less than the width of the smallest known golfer's fist to slightly more than the width of the largest known, golfer's fist; i.e., from about 3 inches to about 8 inches. The preferred length of either grip is about 7 inches. The grips 4, 5 may be constructed from any known grip material, including but not limited to: leather, plastic, rubber, metal, wood, and the like. Leather is most preferred where esthetics are concerned. Rubber is most preferred where economy is concerned.

Splitting the grip into upper grip 4 and lower grip 5 is advantageous because it gives a golfer better leverage to control the heavy putter head.

Figure 3:
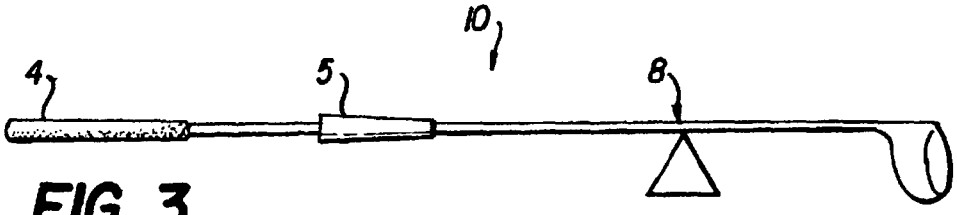
FIG. 3 graphically depicts the approximate location of the center of gravity of the instant putter.

FIG. 3 graphically depicts the approximate location of the center of gravity 8 of an embodiment of the instant putter. Further a general description of the concept of center of gravity of golf clubs is provided by U.S. Pat. No. 5,671,923, with particular reference to FIGS. 20 and 21. The disclosure of U.S. Pat. No. 5,671,923 is incorporated herein by reference.

As stated above, the upper end of the putter of the present invention is preferably held at or about the navel during putting. Because golfers have different heights and weights, the putter of the present invention, such as that of FIG. 1, may be modified to have an adjustable putter length.

Figure 9:
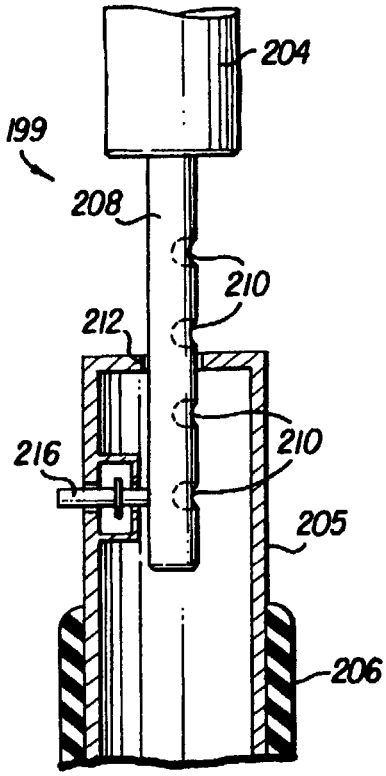
FIG. 9 is a side partial cross-section of a first embodiment of a shaft length adjustment mechanism for use with the present invention.

FIG. 9 shows a first embodiment of a mechanism 199 for providing an adjustable shaft length. The mechanism 199 comprises an upper handle portion 204 having an attached or integral rod 208 provided with longitudinally aligned holes 210. The rod 208 passes through a gasket 212 into a lower handle portion 205. The upper handle portion 204 and lower handle portion 205 are aligned longitudinally as shown by FIG. 9. Within the lower handle portion 205 is located a locking pin 216 having a first end which may extend outwardly from the lower handle portion 205 and an opposed end which contacts the rod 208. The locking pin 216 is biased toward the rod 208 by a spring 220 (FIG. 12) which pushes against an annular stop plate (ring) 222 attached to the locking pin 216. The spring 220 and portion of the locking pin 216 having the annular stop plate 222 is located within a housing 218. Housing 218 is attached to an inside wall of the lower handle portion 205. Preferably, the side of the rod 208 opposing the holes 210 may be provided with a shallow groove to removably engage the locking pin 216 as shown in FIG. 12.

The holes 210 are spaced a distance apart "F" of about ½ to about 1 inch. The diameter "E" of the holes 210 ranges from about 1/16 to about 5/16 inches. The hole diameter "E" being only slightly, e.g., about 1/64 to about 1/16 inch, preferably at most about 1/32 inch, larger than the diameter of the locking pin 216. The hole depth may be typically from about ⅛ inch to about 90% of the rod diameter.

Figure 12:
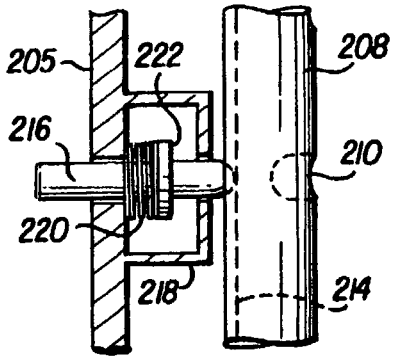
FIG. 12 is an enlarged side view of a portion of the mechanism of FIG. 9 showing a locking mechanism in an unlocked position.
Figure 13:
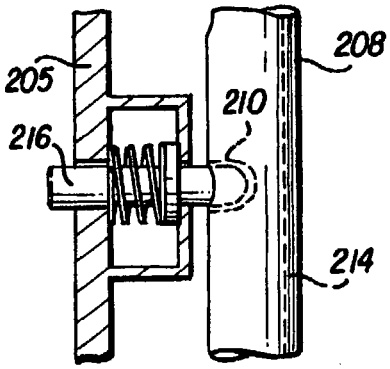
FIG. 13 is a side view of the locking mechanism of FIG. 12 in a locked position.

FIG. 12 shows the locking mechanism of the present invention in its initial unlocked position. In the unlocked position, an end of the locking pin 216 rests within the groove 214. When it is desired to lock the length of the putter, the rod is moved along the groove 214 until the desired length is reached and then the rod 208 is turned 180° to engage the hole 210 at or about the desired length. Once the hole 210 is engaged by the locking pin 216, as shown in FIG. 13, the pin 216 moves into the hole 210 and is preferably entirely within the lower handle portion 205. Thus, the length of the putter is locked into place (like a dead bolt) and it is very difficult to unlock the putter length without taking apart the putter. If desired, the pin 216 may protrude slightly (e.g., about 1 millimeter) so that the pin may be retracted to further adjust the putter length. However, such adjustment would be difficult, if not impossible to be done during golf play. Such adjustment would be designed to be only accomplished at a sports store or comparable facility.

Although the length adjustment mechanism 199 is shown to be located between the upper handle portion 204 and lower handle portion 205, it may be located between the lower handle portion 205 and the accompanying shaft (not shown) or may be located between two portions of the shaft. However, it is preferable to locate the length adjusting mechanism 199 between the handle portions 204, 205.

As shown in FIG. 9, the locking pin 216 protrudes from a portion of the lower handle portion 205 not provided with grip covering material. Of course, if desired, the grip covering material 206 may extend to cover this uncovered portion by merely providing a hole in the covering 206 about the locking pin 216.

Figure 14:
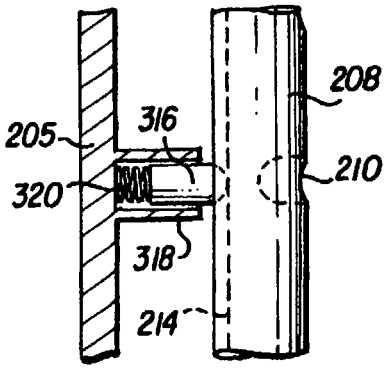
FIG. 14 is a view of a second embodiment of a locking mechanism to replace the locking mechanism of the embodiment of FIG. 9.

FIG. 14 shows a second embodiment of a locking mechanism 299 for adjusting the length of the putter. The locking mechanism 299 has a housing 218 attached to an inner wall of the lower handle portion 205 and has a locking pin 316 located within a cylindrical housing 318. Also a spring 320 is provided to bias the locking pin 316 towards the rod 208. The spring 320 is also located within the housing 318. As shown in FIG. 14, the mechanism 299 is in the unlocked position in which the distal end of the pin 316 is located within the shallow groove 214. The second embodiment 299 would generally operate as does the first embodiment 199.

THE "SWEET SPOT"

The term "sweet spot " (and its variants), as used herein, means: that area on a club face which should come into contact with a golf ball to give the greatest and straightest flight to the ball and the best handling feeling. The sweet spot is an area about the "center of percussion." The center of percussion is generally a small part of the club face, wherein there is very little or no torque when this part of the club face contacts the golf ball. In general use, the sweet spot is the area about the center of percussion over which this torque is nonexistent or substantially not noticeable by a golfer.

In many conventional configurations, the mass of the club head is concentrated just behind the sweet spot to provide the desired characteristics. With the mass so concentrated, the sweet spot tends to be relatively small. This would thus make it more difficult for most golfers to consistently cause the sweet spot to come into contact with the ball. Missing the sweet spot usually causes the ball to travel a considerably lesser distance and often contributes to the tendency to "push" or "pull" the ball (to the right or left, respectively). The techniques to broaden the sweet spot generally provide a means to concentrate the weight of the club head in the heel and the toe rather than directly behind the sweet spot. In one particular design, the head is fabricated of a relatively light material and inserts of denser material are provided in the area of the heel and toe of the club head. In another design, the portion of the club head directly behind the club's ball-striking face is removed so that the weight is necessarily located in other portions of the head, namely the toe and heel portions. In both of these designs the sweet spot is indeed broadened, however, the striking face of each of these clubs would lack the stiffness needed to advantageously utilize the elastic energy generated in the golf ball if it is not made thick enough. This stiffness is needed in order to preclude any deformation of the face, under impact, that would tend to increase the area of contact between the face of the ball and thus dissipate energy in the club head instead of imparting it to the ball.

It is instantly hypothesized that the area of the "sweet spot" is directly proportional to the mass of the head of the instant putter. The present invention enlarges the sweet spot by making the head sufficiently heavy that the inertia of the club overpowers the torque arising when a part of the club face, away from the center of percussion, hits the ball.

PHYSICAL CONSIDERATIONS

To most fully understand the instant invention, consideration must be given to the physical principles that have been exploited in support of it; namely inertia of motion and inertia of rest.

INERTIA OF MOTION—INERTIA OF REST

It is well known physical principle that a body in motion tends to stay in motion; the greater the mass of a moving object, the greater its inertia or momentum of motion. When the momentum of motion of a body is increased, a correspondingly greater force is required to cause it to deviate from its prescribed path. Thus, by providing a putter head having a substantially greater mass than known by the prior art, it would take a correspondingly greater deviating force, i.e., an unintended or involuntary muscle twitch or the like, to otherwise spoil a golfer's intended stroke.

It is an equally well known physical principle that a body at rest tends to stay at rest; the greater the mass of a body at rest, the more likely it will stay at rest. The present invention exploits this principle by providing a counterweight 26 (FIG. 6) of substantial mass in the handle 3 of the instant putter 10 proximate the upper hand grip 4, at about the point that the golfer pivots the putter 10 after committing to a putt stroke. This achieves a putter having a head of substantial mass while also having a relatively normal center of gravity to facilitate putting. The mass of the counterweight 26 can be readily approximated by the general formula:

$$m_1 d_1 = m_2 (l - d_1)$$

where:

$m_1$=the mass of the putter head $d_1$=the distance of the center of gravity of the putter head to the overall center of gravity of the putter $m_2$=the mass of the counterweight to be approximated; and, l=the overall length of the putter Although lead is the preferred material of construction for the instant counterweight 26, any other commonly known such material would be suitable. As the mass of the point is increased, its tendency to remain at rest is increased. Thus, as is the case of the instant putter head 2, by providing a substantial mass at about the instant pivot point, its tendency to move or be moved, after the golfer commits to a putt stroke, is correspondingly diminished. Thus, as in the case of the instant putter head, an increased mass at the instant pivot point would require a correspondingly increased force such as an unintended or involuntary muscle twitch and the like, to deviate it from the golfer's intended stroke.

DEFINITIONS

[The "conventional angle (between the club head and the shaft)" is herein understood to be that obtuse angle defined by the intersection of an imaginary line drawn from the eye of the golfer to the ball; and, an imaginary line drawn from the golfer's navel to the ball; while the golfer is in a substantial conventional stance. The angle that the instant golf head makes with the instant shaft is equal to about this conventional angle.] *Typically, the club has an angle "A" (FIG. 5) between the shaft 1 and the head 2 less than about 90° and more than about 45°.*

The "center of gravity" of the conventional golf club in general; and, the conventional putter or instant putter specifically; is understood to be located on the shaft above the head, a distance within the broad range of about 6 inches to about 18 inches. More specifically the range is from about 7 inches to about 16 inches. Generally, the center of gravity is above the head by a distance of typically about 25%-30% of the total putter length. See, i.e., instant FIG. 3.

The term "of greater than conventional mass" (and its variants) as to the novel head disclosed herein, means: a golf club head having a mass greater than any other known conventional golf club head. The term is intended to relate to golf club heads in general, and putter heads in particular. Typically, such a mass is defined by the range of at least greater than about 16 ounces.

The term "conventional crouched stance" (and its variants) as used herein, relates to that bodily stance that a golfer typically assumes when preparing to strike a golf ball with a golf club in general; and, a putter in particular. Such a stance is in part distinguishable from other atypical stances, less often used in the game of golf, such as a croquet stance.

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

I claim:

1. A putter for use by a golfer in playing golf, including elements comprising:

a shaft having a first end and a second end;

a substantially massive head of greater than about 18 ounces, fixed to said first end; and, a handle fixed to said second end;

said handle comprising:

an upper portion having an upper hand grip for being gripped by the first hand of said golfer;

a lower portion having a lower hand grip spaced from said upper hand grip for being gripped by the second hand of said golfer; and a counterweight positioned in said handle substantially near said upper hand grip sufficient to provide said putter with a center of gravity located on the shaft a distance of about 6 to about 18 inches above the head;

wherein the angle between said shaft and said head is less than about 90° and more than about 45° and said elements are designed, dimensioned, sized and weighted sufficient for providing a sweet spot of said substantially massive head and for enabling said golfer to putt a golf ball by pivoting said putter substantially only at a point located at about said upper hand grip from an otherwise conventional crouched stance,

*wherein the shaft has a shaft length of about 20 to about 24 inches and the handle has a length of about 12 inches to about 14 inches.*

2. The putter of claim 1, wherein said putter has a length ("L") and said lower handgrip is located on said putter for enabling said golfer to putt said golf ball by causing said lower hand grip to pass through an arc defined in part by a point about midway between the crotch and a knee of said golfer while said putter is pivoted at substantially only at said point.

3. The putter of claim 2, wherein said striking head comprises a material selected from the group consisting of iron, steel, nickel, lead, brass, bronze, and combinations thereof.

4. The putter of claim 3, wherein said striking head weighs from about 24 ounces to about 80 ounces.

5. The putter of claim 4, wherein said striking head weighs from about 24 ounces to about 36 ounces.

6. The putter of claim 2, wherein said handle comprises a material selected from the group consisting of: iron, steel, titanium, nickel, lead, aluminum, brass, bronze, carbon fiber composite, fiberglass, and combinations thereof.

7. The putter of claim 2, wherein said handle is from about 14 inches to about 24 inches in length and said upper hand grip is proximately positioned at one end of said handle and said lower hand grip is proximately positioned at the other end of said handle.

8. The putter of claim 2, wherein each said grip is constructed of a material selected from the group consisting of: leather, plastic, rubber, metal, wood, and combinations thereof.

9. The putter of claim 2, wherein each said grip is from about 3 inches to about 8 inches in length.

10. The putter of claim 9, wherein each said grip is about 7 inches in length.

11. The putter of claim 2, wherein said shaft is constructed of a material selected from the group consisting of: iron, steel, titanium, lead, nickel, aluminum, brass, bronze, carbon fiber composite, fiberglass, and combinations thereof.

[12. The putter of claim 2, wherein said putter is from about 29 inches to about 52 inches in length.]

[13. The putter of claim 12, wherein said shaft of said putter is from about 15 inches to about 18 inches in length.]

14. The putter of claim 1, wherein the length of the putter is adjustable.

15. The golf putter of claim 1, wherein the length of the putter is adjustable, comprising:

a first portion of said putter selected from a portion of a member of the group consisting of the shaft and the handle, a longitudinal rod extending from said putter first portion;

a second portion of said putter selected from a portion of a member of the group consisting of the shaft and the handle;

the longitudinal rod being inserted into said putter second portion, said rod being longitudinally movable, and being rotatable about the rod longitudinal axis;

the longitudinal rod having a transverse first hole in its sidewalls and a transverse second hole in its sidewalls, the first hole being a first distance from said putter first portion and said second hole being a second distance from said putter first portion;

a housing, a locking pin and a spring, said housing attached to an inner wall of said putter second portion, said housing containing said spring and at least a portion of said locking pin, said spring biasing said locking pin towards said rod, said pin contacting said rod;

said holes of said rod having a diameter greater than that of said locking pin.

16. The golf putter of claim 15, wherein the rod first hole is longitudinally aligned with the rod second hole.

17. The golf putter of claim 16, wherein said rod defines a longitudinal groove which is located parallel to the longitudinal alignment of the first hole and second hole.

18. The golf putter of claim 15, wherein the first portion of said putter is a first one of said handle portions and the second portion of said putter is a second one of said handle portions.

19. A method using a putter to putt a golf ball, said putter comprising:

a shaft having a first end and a second end;

a substantially massive head of greater than about 16 ounces, fixed to said first end; and, a handle fixed to said second end;

said handle comprising:

an upper portion having an upper hand grip for being gripped by the first hand of said golfer;

a lower portion having a lower hand grip spaced from said upper hand grip for being gripped by the second hand of said golfer; and a counterweight positioned in said handle substantially near said upper hand grip sufficient to provide said putter with a center of gravity located on the shaft a distance of about 6 to about 18 inches above the head;

wherein the angle between said shaft and said head is less than about 90° and more than about 45° and said elements are designed, dimensioned, sized and weighted sufficient for providing a sweet spot of said substantially massive head and for enabling said golfer to putt a golf ball by pivoting said putter substantially only at a point located at about said upper hand grip from an otherwise conventional crouched stance, comprising the steps of:

causing said golfer to grasp said upper hand grip and said lower hand grip;

causing said golfer to assume a substantial conventional crouched stance, wherein both feet of said golfer are on the same side of the line of travel of said golf ball after said golf ball has been putted;

causing said golfer to swing said putter in a stroke defined by a substantially stationary point at about said upper grip positioned at about the navel of said golfer;

a lower hand of said golfer during said stroke forming an arc passing through a point about midway between the crotch and knees of said golfer; and, causing said golfer to strike said golf ball at about the sweet spot of said head of said putter,

*wherein the shaft has a shaft length of about 20 to about 24 inches and the handle has a length of about 12 inches to about 14 inches.*

20. A method using the putter of claim 19 to putt a golf ball, comprising:

causing said golfer to grasp said upper hand grip and said lower hand grip;

causing said golfer to assume a substantial conventional crouched stance, whereby both feet of said golfer are on the same side of the line of travel of said golf ball after said golf ball has been putted;

causing said golfer to swing said putter in a stroke defined by a substantially stationary point at about said upper grip positioned at about the navel of said golfer; one of the golfer's hands making an arc passing through a point about midway between the crotch and knees of said golfer during the stroke, and causing said golfer to strike said golf ball at about the sweet spot of said head of said putter.

21. A golf putter for use by a golfer in playing golf, including elements comprising:

a shaft having a first end and a second end; said shaft being constructed of a material selected from the group consisting of: iron, steel, titanium, lead, nickel, aluminum, brass, bronze, carbon fiber composite, fiberglass, and combinations thereof;

a substantially massive head weighing from about 16 ounces to about 80 ounces and constructed of a material selected from the group consisting of iron, steel, lead nickel, brass, bronze, and combinations thereof, fixed to said first end;

a handle fixed to said second end; said handle further comprising an upper hand grip for being gripped by the first hand of said golfer; a lower hand grip substantially dimensionally spaced from said upper hand grip for being gripped by the second hand of said golfer; and, a counterweight positioned in said handle substantially near said upper hand grip sufficient to provide said putter with a conventional center of gravity;

said handle [being from about 14 inches to about 24 inches in length and] being constructed of a material selected from the group consisting of: iron, steel, titanium, lead, nickel, aluminum, brass, bronze, carbon fiber composite; fiberglass, and combinations thereof; and, said upper hand grip is proximately positioned at one end of said handle and said lower hand grip is proximately positioned at the other end of said handle; wherein each said grip is from about 3 inches to about 8 inches in length and constructed of a material selected from the group consisting of: leather, plastic, rubber, metal, wood, and combinations thereof; and wherein the angle between said shaft and said head is less than about 90° and more than about 45° and said elements are designed, dimensioned, sized and weighted sufficient for providing a sweet spot of said substantially heavy head and for enabling said golfer to putt a golf ball by pivoting said putter substantially only at a point located at about said upper hand grip from an otherwise conventional crouched stance,

*wherein the shaft has a shaft length of about 20 to about 24 inches and the handle has a length of about 12 inches to about 14 inches.*

22. The golf putter of claim 21, wherein the head is designed, dimensioned, sized and weighted sufficient for maximizing the sweet spot.

23. The golf putter of claim 21, wherein the length *of* the putter is adjustable.

24. The golf putter of claim 21, wherein the length of the putter is adjustable, comprising:

a first portion of said putter selected from a portion of a member of the group consisting of the shaft and the handle, a longitudinal rod extending from said putter first portion;

a second portion of said putter selected from a portion of a member of the group consisting of the shaft and the handle;

the longitudinal rod being inserted into said putter second portion, said rod being longitudinally movable, and being rotatable, about the rod longitudinal axis;

the longitudinal rod having a transverse first hole in its sidewalls and a transverse second hole in its sidewalls, the first hole being a first distance from said putter first portion and said second hole being a second distance from said putter first portion;

a housing, a locking pin and a spring, said housing attached to an inner wall of said putter second portion, said housing containing said spring and at least a portion of said locking pin, said spring biasing said locking pin towards said rod, said pin contacting said rod;

said holes of said rod having a diameter greater than that of said locking pin.

25. The golf putter of claim 24, wherein the rod first hole is longitudinally aligned with the rod second hole.

26. The golf putter of claim 25, wherein said rod defines a longitudinal groove which is located parallel to the longitudinal alignment of the first hole and second hole.

27. The golf putter of claim 24, wherein the first portion of said putter is a first one of said handle portions and the second portion of said putter is a second one of said hand portions.

28. A golf putter, comprising a handle, a shaft and a head, wherein the length of the putter is adjustable, comprising:

a first portion of said putter selected from a portion of a member of the group consisting of the shaft and the handle, a longitudinal rod extending from said putter first portion;

a second portion of said putter selected from a portion of a member of the group consisting of the shaft and the handle;

the longitudinal rod being inserted into said putter second portion, said rod being longitudinally movable, and being rotatable, about the rod longitudinal axis;

the longitudinal rod having a transverse first hole in its sidewalls and a transverse second hole in its sidewalls, the first hole being a first distance from said putter first portion and said second hole being a second distance from said putter first portion;

a housing, a locking pin and a spring, said housing attached to an inner wall of said putter second portion, said housing containing said spring and at least a portion of said locking pin, said spring biasing said locking pin towards said rod, said pin contacting said rod;

said holes of said rod having a diameter greater than that of said locking pin.

29. The golf putter of claim 28, wherein the rod first hole is longitudinally aligned with the rod second hole.

30. The golf putter of claim 29, wherein said rod defines a longitudinal groove which is located parallel to the longitudinal alignment of the first hole and second hole.

31. The golf putter of claim 28, wherein the first portion of said putter is a first one of said handle portions and the second portion of said putter is a second one of said hand portions.

*32. The putter of claim 33, wherein said lower hand grip portion is spaced from said upper hand grip portion.*

*33. A golf putter, including elements comprising:*

*a shaft having a first end and a second end;*

*a substantially massive head of greater than about 18 ounces to about 80 ounces, fixed to said first end; and,*

*a handle extending from said second end;*

*said handle comprising:*

*an upper hand grip portion;*

*a lower hand grip portion; and*

*said putter having a center of gravity located on the shaft a distance of about 6 to about 18 inches above the head;*

*wherein said elements are designed, dimensioned, sized and weighted sufficient for providing a sweet spot of said substantially massive head and for enabling said golfer to putt a golf ball by pivoting said putter from an otherwise conventional crouched stance,*

*wherein sufficient weight is positioned near or within said upper hand grip portion to provide said putter with the center of gravity located on the shaft portion the distance of about 6 to about 18 inches above the head,*

*wherein the shaft has a shaft length of about 20 to about 24 inches and the handle has a length of about 6 inches to about 14 inches.*

*34. The putter of claim 33, a counterweight positioned substantially near or within said upper hand grip portion sufficient to provide said putter with the center of gravity located on the shaft the distance of about 6 to about 18 inches above the head.*

*35. The putter of claim 33, wherein said head weighs from greater than about 18 to about 36 ounces.*

*36. A method for making a golf putter, the putter comprising a head, a shaft portion and a handle portion, the handle portion extending from the shaft portion and the handle portion sized and configured for the golfer to grip the putter with two hands, the head and the handle portion being at opposed ends of the putter, comprising:*

*fixing a substantially massive head of about 16 ounces to 80 ounces, to a first end of the shaft portion; and,*

*wherein said putter has a center of gravity located on the shaft portion a distance of about 6 to about 18 inches above the head;*

*wherein said elements are designed, dimensioned, sized and weighted sufficient for providing a sweet spot of said substantially massive head,*

*wherein sufficient weight is positioned near or within said handle portion to provide said putter with said center of gravity located on the shaft portion a distance of about 6 to about 18 inches above the head,*

*wherein the shaft has a shaft length of about 20 to about 24 inches and the handle has a length of about 6 inches to about 14 inches.*

*37. The method of claim 36, wherein said head weighs from greater than about 18 ounces to about 80 ounces.*

*38. The method of claim 36, wherein a counterweight is positioned near or within said handle portion sufficient to provide said putter with said center of gravity located on the shaft portion a distance of about 6 to about 18 inches above the head.*

*39. The method of claim 36, wherein said head weighs from about 16 to about 36 ounces.*

*40. A method of using a putter to putt a golf ball, said putter comprising:*

*a shaft having a first end and a second end;*

*a substantially massive head of greater than about 16 to 80 ounces, fixed to said first end; and,*

*a handle extending from the second end of the shaft and sized and configured to allow two hands of a golfer to grip the putter;*

*said handle comprising:*

*an upper hand grip portion; and*

*a lower hand grip portion; and*

*said putter having a center of gravity located on the shaft a distance of about 6 to about 18 inches above the head;*

*wherein said elements are designed, dimensioned, sized and weighted sufficient for providing a sweet spot of said substantially massive head and for enabling said golfer to putt a golf ball from an otherwise conventional crouched stance,*

*wherein sufficient weight is positioned near or within said handle portion to provide said putter with said center of gravity located on the shaft portion a distance of about 6 to about 18 inches above the head,*

*wherein the shaft has a shaft length of about 20 to about 24 inches and the handle has a length of about 6 inches to about 14 inches,*

*comprising the steps of:*

*causing said golfer to grasp said upper hand grip portion and said lower hand grip portion;*

*causing said golfer to assume a substantially conventional crouched stance, wherein both feet of said golfer are on the same side of the line of travel of said golf ball after said golf ball has been putted;*

*causing said golfer to swing said putter; and,*

*causing said golfer to strike said golf ball at about the sweet spot of said head of said putter.*

*41. The method of claim 40, wherein said head weighs from greater than about 18 to about 80 ounces.*

*42. The method of claim 40, wherein a counterweight is positioned near or within said handle portion sufficient to provide said putter with said center of gravity located on the shaft portion a distance of about 6 to about 18 inches above the head.*

*43. The method of claim 40, wherein said head weighs from about 16 to about 36 ounces.*

*44. A golf putter comprising:*

*a shaft having a first end and a second end;*

*a substantially massive head of greater than about 18 to about 80 ounces, fixed to the first end of the shaft;*

*a handle extending from the second end of the shaft and sized and configured to allow two hands of a golfer to grip the putter; and*

*a counterweight positioned near an end of the handle away from the second end of the shaft;*

*the putter having a center of gravity located on the shaft a distance of about 6 to about 18 inches above the head;*

*wherein the shaft has a shaft length of about 20 to about 24 inches and the handle has a length of about 6 inches to about 14 inches.*

*45. The putter of claim 44, wherein the handle is an extension of the shaft.*

*46. The method of claim 36, wherein the substantially massive head has a weight of about 18 to about 36 ounces.*

*47. The method of claim 40, wherein the substantially massive head has a weight of about 18 to about 36 ounces.*

*48. The putter of claim 44, wherein the substantially massive head has a weight of greater than about 18 to about 36 ounces.*

*49. The method of claim 19, wherein the substantially massive head has a weight of about 18 to about 36 ounces.*

*50. The putter of claim 21, wherein the substantially massive head has a weight of about 18 to about 36 ounces.*

*51. The putter of claim 33, wherein the substantially massive head has a lowermost outer wall, an uppermost outer wall, opposed outer sidewalls, and a striking face, the lowermost outer wall being parallel to the uppermost outer wall and extending back from the face substantially the entire width of the putter, the opposed outer sidewalls attached to the lowermost outer wall and the uppermost outer wall.*

*52. The method of claim 36, wherein the substantially massive head has a lowermost outer wall, an uppermost outer wall, opposed outer sidewalls, and a striking face, the lowermost outer wall being parallel to the uppermost outer wall and extending back from the face substantially the entire width of the putter, the opposed outer sidewalls attached to the lowermost outer wall and the uppermost outer wall.*

*53. The method of claim 39, wherein the substantially massive head has a lowermost outer wall, an uppermost outer wall, opposed outer sidewalls, and a striking face, the lowermost outer wall being parallel to the uppermost outer wall and extending back from the face substantially the entire width of the putter, the opposed outer sidewalls attached to the lowermost outer wall and the uppermost outer wall.*

*54. The putter of claim 44, wherein the substantially massive head has a lowermost outer wall, an uppermost outer wall, opposed outer sidewalls, and a striking face, the lowermost outer wall being parallel to the uppermost outer wall and extending back from the face substantially the entire width of the putter, the opposed outer sidewalls attached to the lowermost outer wall and the uppermost outer wall.*

*55. The putter of claim 33, wherein the center of gravity is above the head by a distance of about 25 to 30% of the total putter length.*

*56. The method of claim 36, wherein the center of gravity is above the head by a distance of about 25 to 30% of the total putter length.*

*57. The method of claim 40, wherein the center of gravity is above the head by a distance of about 25 to 30% of the total putter length.*

*58. The putter of claim 44, wherein the center of gravity is above the head by a distance of about 25 to 30% of the total putter length.*

*59. The method of claim 1, wherein the center of gravity is above the head by a distance of about 25 to 30% of the total putter length.*

*60. The putter of claim 19, wherein the center of gravity is above the head by a distance of about 25 to 30% of the total putter length.*

*61. The putter of claim 21, wherein the center of gravity is above the head by a distance of about 25 to 30% of the total putter length.*

*62. The method of claim 33, wherein the center of gravity is located on the shaft a distance of about 7 to about 16 inches above the head.*

*63. The method of claim 36, wherein the center of gravity is located on the shaft a distance of about 7 to about 16 inches above the head.*

*64. The method of claim 40, wherein the center of gravity is located on the shaft a distance of about 7 to about 16 inches above the head.*

*65. The putter of claim 44, wherein the center of gravity is located on the shaft a distance of about 7 to about 16 inches above the head.*

*66. The putter of claim 62, wherein the shaft has a shaft length of about 20 to about 24 inches and the handle has a length of about 12 inches to about 14 inches.*

*67. The putter of claim 66, wherein the head has a face height of about 0.75 to 1 inch and the head has a weight of greater than about 18 to about 36 ounces.*

*68. The putter of claim 63, wherein the shaft has a shaft length of about 20 to about 24 inches and the handle has a length of about 12 inches to about 14 inches.*

*69. The method of claim 68, wherein the head has a face height of about 0.75 to 1 inch and the head has a weight of about 18 to about 36 ounces.*

*70. The method of claim 64, wherein the shaft has a shaft length of about 20 to about 24 inches and the handle has a length of about 12 inches to about 14 inches.*

*71. The method of claim 70, wherein the head has a face height of about 0.75 to 1 inch and the head has a weight of about 18 to about 36 ounces.*

*72. The putter of claim 65, wherein the shaft has a shaft length of about 20 to about 24 inches and the handle has a length of about 12 inches to about 14 inches.*

*73. The putter of claim 72, wherein the head has a face height of about 0.75 to 1 inch and the head has a weight of greater than about 18 to about 36 ounces.*

* * * * *